(12) United States Patent
Kortekaas et al.

(10) Patent No.: US 8,770,144 B2
(45) Date of Patent: Jul. 8, 2014

(54) METHOD OF MILKING A DAIRY ANIMAL BY MEANS OF A MILKING SYSTEM

(75) Inventors: Martinus Petrus Kortekaas, Lisse (NL); Pieter Gerlof De Groot, Giessenburg (NL)

(73) Assignee: Lely Patent N.V., Maassluis (NL)

( * ) Notice: Subject to any disclaimer, the term of this patent is extended or adjusted under 35 U.S.C. 154(b) by 16 days.

(21) Appl. No.: 13/456,355

(22) Filed: Apr. 26, 2012

(65) Prior Publication Data

US 2012/0204798 A1 Aug. 16, 2012

Related U.S. Application Data

(63) Continuation of application No. PCT/NL2010/000138, filed on Sep. 28, 2010.

(30) Foreign Application Priority Data

Nov. 5, 2009 (NL) ...................................... 1037448

(51) Int. Cl.
*A01J 5/00* (2006.01)

(52) U.S. Cl.
USPC ..................................... 119/14.02; 119/14.18

(58) Field of Classification Search
USPC .......... 119/14.01, 14.02, 14.03, 14.18, 14.08, 119/51.01, 51.02, 51.12, 52.1
See application file for complete search history.

(56) References Cited

U.S. PATENT DOCUMENTS

| | | | |
|---|---|---|---|
| 5,769,023 A * | 6/1998 | van der Lely et al. ..... | 119/14.02 |
| 5,778,820 A * | 7/1998 | van der Lely et al. ..... | 119/14.18 |
| 6,263,832 B1 * | 7/2001 | van den Berg ............. | 119/14.08 |
| 6,543,381 B1 * | 4/2003 | Birk et al. .................. | 119/14.08 |
| 6,622,651 B1 * | 9/2003 | Dessing ...................... | 119/14.08 |
| 6,651,585 B2 * | 11/2003 | van den Berg ............. | 119/51.02 |
| 2003/0226508 A1 * | 12/2003 | Theelen ...................... | 119/14.02 |
| 2006/0249083 A1 * | 11/2006 | Johansson et al. .......... | 119/14.03 |
| 2007/0215051 A1 * | 9/2007 | Bjork et al. ................. | 119/14.03 |
| 2008/0017118 A1 * | 1/2008 | Wigholm et al. ........... | 119/14.03 |
| 2009/0288605 A1 * | 11/2009 | DeVilliers .................. | 119/14.02 |

FOREIGN PATENT DOCUMENTS

| | | |
|---|---|---|
| EP | 64117 A1 | 11/1982 |
| EP | 1264531 A1 | 12/2002 |
| EP | 1264532 A1 | 12/2002 |
| WO | WO9605723 A1 | 2/1996 |
| WO | WO2005092084 A1 | 10/2005 |

OTHER PUBLICATIONS

International Search Report of PCT/NL2010/000138 issued on Jan. 12, 2011.

\* cited by examiner

*Primary Examiner* — Trinh Nguyen
(74) *Attorney, Agent, or Firm* — Hoyng Monegier LLP; Minerva Rivero; David P. Owen

(57) ABSTRACT

The invention provides a system and method of milking and feeding a dairy animal, wherein feed is dispensed in portions during the milking. At a predetermined moment the portion size is reduced, in order to increase the chance that the animal has actually eaten the last allocated portion at the moment when the milking has been ended, so that it will not hesitate to leave the milking parlor. This will result in a reduction of the time during which the milking parlor is unnecessarily occupied, and in an enhanced efficiency.

16 Claims, 1 Drawing Sheet

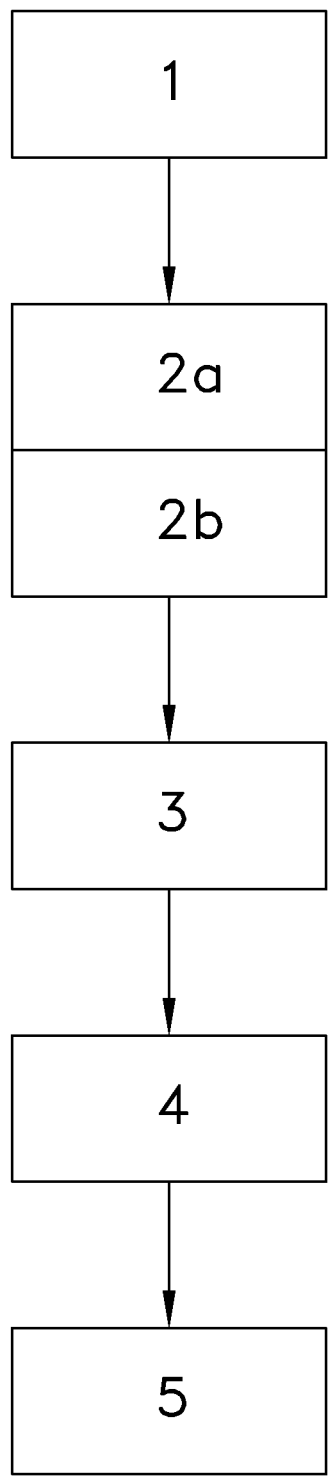

METHOD OF MILKING A DAIRY ANIMAL BY MEANS OF A MILKING SYSTEM

CROSS REFERENCE TO RELATED APPLICATIONS

This application is a continuation of PCT application number PCT/NL2010/000138 filed on 28 Sep. 2010, which claims priority from Netherlands application number 1037448 filed on 5 Nov. 2009. Both applications are hereby incorporated by reference in their entireties.

BACKGROUND OF THE INVENTION

1. Field of the Invention

The present invention relates to a method of feeding and milking a dairy animal by means of a milking system comprising a milking parlour with a milking device and a feeding device. More particularly, the invention relates to a feeding and milking method and system that reduces dispensed feed portions when a predetermined sub-phase of the milking is reached, prior to the ending of the milking.

2. Description of the Related Art

Conventional methods and systems for feeding and milking dairy animals has been described in documents such as for example WO2005/092084, incorporated herein by reference in its entirety. WO2005/092084 discloses a method and a system for feeding dairy animals in a milking box, wherein an estimated end time for the milking is determined, and wherein the feeding stops before said end time is reached. The object is to prevent that feed remains in the milking box after the milking itself has been ended, because the dairy animal would in that case occupy the milking box unnecessarily long.

WO2005/092084 thus recognizes the problem that a dairy animal is not always willing to leave the stable in time. However, a disadvantage of the disclosed method and system is that it does not take unexpected deviations in a milking into account. If, for example in the period in which no more feed is dispensed, a situation occurs that prolongs the milking, such as kicking off of a teat cup, or a milk flow that only showed a temporary decrease, the dairy animal is found to become restless.

BRIEF SUMMARY OF THE INVENTION

The present invention aims at improving the known method and device. An object of the present invention is to provide a method in which the capacity of a milking system can be increased and in which restlessness of a dairy animal can be prevented as much as possible. For this purpose, the invention is characterized in that when a predetermined sub-phase of the milking is reached, prior to the ending of the milking, the size of the dispensed feed portions is reduced. The insight with respect to this invention is that feeding smaller portions results in that the dairy animal will sooner have consumed them. As a result thereof, the animal will stay in the milking box only very briefly, even if the milking actually ends just after a feed portion has been dispensed. However, if the milking unexpectedly takes longer, the animal will still be provided with feed in order to remain calm, although in smaller portions in order to prevent or to limit overfeeding. It is pointed out here that the portion size is of course greater than zero, in order to ensure the dispensing of portions.

The method according to the invention serves to milk a dairy animal by means of a milking system. The milking system is preferably an automatic milking system, wherein a robot arm is provided for attaching a teat cup. The milking system comprises a milking parlour where the dairy animal can be milked. The milking parlour may be provided with an entrance gate and an exit gate. Preferably, the entrance gate is opened for the dairy animals during normal operation, in such a manner that the dairy animals are allowed to visit freely the milking parlour. However, a preselection may take place, wherein dairy animals are only allowed access if they will actually be milked. The milking system is further provided with a milking device and a feeding device. When the dairy animal presents itself at the milking parlour for a milking, the dairy animal is identified according to the method. For identification purposes, each dairy animal may for example be provided with a collar with a transponder disposed thereon. After identification it can be decided whether or not a milking of the reporting animal is desirable. If a milking is desirable, the dairy animal is kept in the milking parlour. This is possible, for example, by keeping the entrance gate and the exit gate closed by means of a fencing. During the milking, feed is dispensed to the dairy animal by means of the feeding device. The presence of feed generally makes a dairy animal feel at ease in the milking parlour.

In accordance with various aspects of the present invention, the dispensing of feed is continued during the whole milking, but in smaller portions from a predetermined sub-phase thereof. The consumption of feed can thus advantageously be better attuned to a length of time of a milking. By the improved adaptation, the chance that the dairy animal will be willing to leave the milking parlour immediately at the ending of the milking can be considerably increased. The occupancy time per animal of the automatic milking system can thus advantageously be reduced, so that the capacity of an automatic milking system for a herd of dairy animals can increase. Moreover, the steps of the method can gradually succeed one another in such a manner that the dairy animal remains calm, which contributes to the well-being of the dairy animal. Lack of feed during the milking can be prevented, so that restlessness in the milking parlour can be avoided as much as possible. An additional bonus effect of the invention is that most feed portions can have a relatively large size, which can in practice be achieved with the desired accuracy in a simpler manner. For, if all the feed or at least the greater part thereof is dispensed in small portions, with an inherent poorer accuracy, the total amount to be dispensed will also be metered less accurately. By dispensing the feed for the greater part in large portions according to the invention, which portions can be metered to a high degree of accuracy, it will be possible to manage the total feed supply more accurately.

It is pointed out that WO96/05723, which is hereby incorporated by reference in its entirety, discloses a method and system in which it can also occur that the feeding rate is decreased. However, it is not clear how this is achieved (fewer portions per unit of time, smaller portions, etcetera) and this document aims at providing a certain amount of feed as homogenously as possible. If the feeding period has to be prolonged, because for example the milking or treating time becomes longer than predicted, less feed should be dispensed in a longer period of time. Of course, this could take place by reducing the portion size. However, the disclosed method mentions nowhere the reaching of a predetermined sub-phase of the milking, in order to reduce the feed portion size subsequently and in dependence thereon. On the contrary, if no unexpected prolongations occur, the feeding rate does not decrease here, which on the other hand does take place in the present invention, with the advantage resulting therefrom. Another practical difference is that the known method and device aim at providing a predetermined amount of feed as uniformly as possible, in contrast with the present invention. In the present invention, in principle (although not necessarily) more feed is dispensed if the end time becomes later, i.e. if the milking takes longer than estimated, and less feed is dispensed if the milking takes shorter. At least, the insight of the present invention is not disclosed in WO96/05723.

In the method according to the present invention the milking-ending criterion is monitored, in order to see whether the milking can be ended, and that it is also monitored whether the sub-phase has been reached. Moreover, the estimated end time is advantageously determined dynamically, i.e. is adjusted during the milking on the basis of one or more measured parameters, such as development of the milk flow, fat percentage of the milk, measured stress of the dairy animal, etcetera. It is thus possible to predict very accurately when the milking or total treatment will actually be ended, so that it will also be possible to determine very accurately when switching to the feeding regime with the smaller feed portions should take place.

In particular, an estimated end time for the milking is determined on the basis of the milking-ending criterion. The end time is then, for example, the moment when the presence of the dairy animal in the milking box is no longer required or desired. This is in particular the ending moment of the milking, if necessary including all post-treatments such as teat cleaning or disinfection etcetera. Also here, the milking usually ends on the basis of a milking-ending criterion, for example a fixed or animal-individual milking time, or a milk (milking) parameter which exceeds or comes below a threshold value. This will be set out below in further detail. In general, the situation is such that with said milking-ending criterion, as well as with general professional knowledge about the dairy animal and/or with historical data, in particular animal-individual historical data, the estimated end time can be calculated. By way of example, the estimated milk yield for a specific animal can be determined fairly accurately from the past milking interval, if desired corrected by the amount of feed consumed by that animal in the past period of time. It can subsequently be checked in the historical data what is the average (or estimated) associated milking time. The estimated end time can thus be determined. It should be noted that historical data may relate to earlier lactations of the same animal or of comparable animals, but for example also to earlier milkings of the animal in question in the same lactation, such as the past X milkings, or a running average thereof. It is also possible to determine the estimated end time of the milking on the basis of two or more criteria which should be met. It is thus possible, for example, to prevent that the milking is wrongly ended.

Meeting the milking-ending criterion comprises in particular that the momentary milk flow comes below a first milk flow threshold value. In practice, the milk flow coming below a first threshold is an attractive and frequently used criterion to determine the end of a milking. The milk flow advantageously relates to the milk flow from the last teat that is being milked or from the last two teats that are being milked. This enables a more accurate determination of the end time.

In particular, the milk flow, in total or from the last teat/teats, should come below the first milk flow threshold value during a predetermined milk flow threshold time. It is thus prevented that in the case of an accidental dip in the milk flow, caused by whatever reason, the feed portion size will not already be adjusted unnecessarily.

With respect to the first milk flow threshold value for the milk flow it holds that it may be selected as a fixed one, or on a historical basis because the milk yield and for example also the milk flow size for an animal species may vary during a lactation and between lactations. Advantageously, one or more of the milk flow threshold values are selected in an animal-individual manner. The same holds for the milk flow threshold time which may be selected in dependence on the animal species or the animal.

In another embodiment, meeting the milking-ending criterion comprises that the fat percentage of the milk, in particular from the last teat that is being milked, exceeds a first threshold fat percentage. The fat percentage of the momentarily yielded milk is another criterion that can be used to calculate the end time of the milking, and be combined, if desired, with one or more additional criteria. This percentage rises relatively strong at the end of the milking.

According to the invention, when a predetermined sub-phase is reached, prior to the ending of the milking, the size of the dispensed feed portions will be reduced. The sub-phase may, for example, be a predetermined percentage or part of the milking, so that the sub-phase begins after said fixed part of the time until the estimated end time of the milking has elapsed. The fixed percentage may be, for example, between at least 70% and not more than 90%, in particular between 70% and not more than 80%, but preferably between 80% and not more than 90%. At these percentages, the dairy animal is completely provided with feed during almost the whole milking, so that restlessness is avoided as much as possible, while in the last phase, consequently after the sub-phase has been reached, feed is still being dispensed, but so little per portion that to a high degree of probability the feed will have been consumed substantially completely at the moment of ending the milking, so that the dairy animal will quickly leave the milking parlour. The percentage may be established per individual animal, for example on the basis of historical data, in particular with respect to eating rate.

Alternatively, the sub-phase may begin at a predetermined period of time preceding the end time. Said period of time then corresponds for example to the time the animal needs to consume a (whether or not last) dispensed portion of feed. Said predetermined period of time may, if desired, be selected in an animal-individual manner, for example on the basis of historical data, or dynamically on the basis of the current eating rate of the animal.

Both in the case that the sub-phase begins when a percentage of the time until the estimated end time is reached, and in the case that the sub-phase begins at a period of time preceding the moment when the estimated end time is reached, a possible dawdling time can be taken into account. This means that the animal waits a moment before leaving the milking box, even when there is no more feed available. Although this time is almost zero for a lot of dairy animals, it can be non-negligible for some animals.

In one embodiment, the sub-phase begins when the milk flow, in total or from the last teat/teats, comes below a second milk flow threshold value. In particular, said second milk flow threshold value can be selected in such a manner that this criterion is less strict than the milking-ending criterion, so that it is also ensured that the reduction of the feed portions takes place prior to the ending of the milking. In particular, the milking-ending criterion is of the same type, more in particular wherein meeting the milking-ending criterion comprises that the momentary milk flow, in particular the milk flow from the last teat that is being milked or from the last two teats that are being milked, comes below a first milk flow threshold value, in particular during a milk flow threshold time, and the second milk flow threshold value is higher than the first milk flow threshold value. It should be noted that, also in this case, it is possible to look at a teat, a group of teats or a total milk flow.

The sub-phase advantageously begins when the fat percentage of the milk, in particular from the last teat that is being milked, exceeds a second threshold fat percentage. In particular, the milking-ending criterion is selected such that the fat percentage of the milk, in particular of the milk from the last teat that is being milked, exceeds a first threshold fat percentage, and the second threshold fat percentage is lower than the first threshold fat percentage. The first and/or the second threshold fat percentage is advantageously selected in an animal-individual manner, optionally on the basis of historical data. In particular for dairy cows, the feed portion size is adjusted when a fat percentage of between 4.5% and 5.5%, in particular between 3.5% and 4.5%, is reached, and the milking is ended if the fat percentage still rises for example between 0.5% and 1%, although these numbers may be selected differently for other animal species, or special dairy animal breeds. In an embodiment of the method according to the invention, the feed portion size is adjusted after a predetermined relative fat percentage of the yielded milk has been reached. The fat percentage can be measured during the milking. A control signal for adjusting the feed supply can be issued at the moment when the relative fat percentage exceeds a preset change, such as a predetermined part of an animal-individual threshold or a change per unit of time. By controlling the supply of feed in dependence on a fat percentage of yielded milk, a reliable and accurate prediction of the remaining time until the dairy animal leaves the milking parlour can advantageously be obtained. An improved adaptation of the feeding time can thus advantageously be achieved, so that a dairy animal will quickly leave the milking parlour after the milking has been ended.

In a further embodiment, dispensing feed in a plurality of feed portions during the milking is divided into at least three successive predetermined sub-phases, wherein the feed portion size in each later sub-phase is smaller than in each preceding sub-phase. In this manner, the feed portion size can be reduced more and more towards the end of the milking, i.e. in each case when a next, predetermined sub-phase is reached. It is thus possible to prevent even better that the animal is still eating at the end time, while, moreover, the total feed supply can be metered to a high degree of accuracy. It is pointed out that in other embodiments the feed portion size could, if desired, also increase to a previously adopted initial value, in particular the initial value. This could, for example, occur if the milk flow collapses without the actual end of the milking approaching. This is for example a property of a specific dairy animal, or is caused by external factors such as a teat cup being kicked off, stress, etcetera. In that case, according to the method, the feed portion size per se can actually be reduced when the predetermined sub-phase has begun, while, when the criterion for reaching the sub-phase is no longer met, the feed portion size is reset to its initial size.

In the present invention, the total amount of feed to be provided is in principle free to some extent, i.e. more or less feed than the feed balance can be provided, according to whether or not the end time changes. However, this can be prevented by adjusting the period of time between the separate portions accordingly. It is thus possible still to provide in total the exact feed balance. It is also possible to make the period of time between feed portions dependent on the eating rate of the animal. For example, a new portion is only dispensed when the previous one has been eaten to some extent or totally. The present invention still provides advantages, due to the fact that, in the case of smaller portions, said eating time per portion is shorter.

In particular, the smaller feed portion size in the predetermined sub-phase, or in any later sub-phase, is not more than half of the feed portion size in the preceding phase, the immediately preceding phase, respectively. In practice, a favourable portion size for the first phase can be between for example 200 grams and 2 kg. A favourable smaller portion size in the predetermined sub-phase, the later phase, respectively, is for example between 50 grams and 200 grams.

In a particular embodiment, the method according to the invention is implemented in an automatic milking system, such as the known Lely Astronaut™. The automatic milking system may comprise a robot arm for attaching at least two, in particular four, teat cups. The invention may also be implemented in other, for example non-automatic or semi-automatic milking systems, such as a carrousel or herringbone system. In this case, milking clusters are attached manually (or sometimes (semi)automatically). Nevertheless, also here the advantage of reducing unnecessary occupancy is provided.

The invention further relates to a milking system for milking a dairy animal. The milking system comprises a milking parlour, for example provided with an entrance gate and an exit gate, for keeping a dairy animal. The entrance and exit gate may for example be provided with a controlled fencing. All this is not strictly necessary, and the system may also comprise a carrousel system or the like.

The milking system further comprises an identification system for identifying a dairy animal that presents itself for a milking. The milking system has a milking device for milking the dairy animal and a feeding device for dispensing feed to a dairy animal in the milking parlour. The milking system comprises a control device, wherein the control device is configured to control the milking device to milk a dairy animal, if desired, and to control the feeding device for feeding the dairy animal.

The milking system according to the invention is characterized in that the control device is further configured to carry out the method according to the invention. For this purpose, the control device is configured to monitor a predetermined milking-ending criterion, to monitor the reaching of a predetermined sub-phase of the milking, and to reduce the feed portion size when said sub-phase is reached. If necessary, the milking system may comprise a measuring device for measuring a milking parameter, on the basis of the value of which the milking-ending criterion can be monitored and/or the reaching of the sub-phase can be monitored. As an example of such a measuring device a milk flow meter is mentioned here, but any other measuring device for a milk (milking) quantity already mentioned above or used in the state of the art for assessing the milking can also be used within the scope of the invention.

In a particular embodiment, the milking system comprises an automatic milking device with a milking parlour, also called a milking box, and a robot arm for attaching teat cups, wherein, without human intervention, an animal can be admitted, if desired (locally) cleaned, and milked. An example of such an automatic milking system is the known Lely Astronaut™, which is hereby incorporated by reference.

In an embodiment of the milking system according to the invention, the milking parameter relates to an estimated end time of the milking. For the sake of convenience, in practice the estimated end time, i.e. a point of time, can be converted into a planned time of stay in the milking parlour, and vice versa.

In an embodiment of the milking system according to the invention, the feeding device comprises a metering device for dispensing feed in metered portions. From the metering device feed is supplied to a feed trough. The feeding device may comprise a metering device which is configured to dispense a portion of feed which is fixed for a period of time. A feed balance can, for example, be dispensed in portions of 200 grams. In embodiments, the feeding device comprises a metering device which is configured to dispense feed in a variable metered portion. This makes it possible for the metering device to dispense feed at a variable metering speed following the reception of a corresponding signal, for example when the predetermined sub-phase is reached. By dispensing less feed per unit of time in an end phase of the feeding time, it can be promoted that a dairy animal will quickly leave the milking parlour at the end of the milking, because there is no more feed left.

In an embodiment, the milking system according to the invention has a teat cleaning device for cleaning at least one teat. The control device may further be configured to put the teat cleaning device into operation in order to clean a teat of the dairy animal.

BRIEF DESCRIPTION OF THE DRAWINGS

The features and advantages of the invention will be appreciated upon reference to the following drawings, in which:

FIG. 1 is a schematic diagram of the method according to the present invention.

DESCRIPTION OF ILLUSTRATIVE EMBODIMENTS

The following is a description of certain embodiments of the invention, given by way of example only and with reference to the drawings. FIG. 1 shows in a flowchart successive steps of the method according to the invention. In a first step 1 of the method according to the invention, a dairy animal is identified. On the basis of the identification a control device can decide whether or not the dairy animal should be milked. If the dairy animal should be milked, the dairy animal is arranged in a milking parlour and a milking can start.

Furthermore, on the basis of the animal identification, historical information can be retrieved, such as information with respect to a milking duration which is typical for that animal, associated with the milking interval elapsed, optionally corrected for the feed eaten in that period. Information regarding a (running) average fat percentage, an average change therein during a milking, etcetera, can also be retrieved or read. The control device can then calculate when the milking is expected to be ended, and both monitor and/or calculate the milking-ending criterion, and monitor the reaching of the sub-phase. The control device can, in a general sense, further be configured to monitor dynamically the criterion, the sub-phase(s), respectively, i.e. if due to any circumstance the estimated end time will for example be later, this will also be processed in the control. As an example may serve the situation in which a teat cup is kicked off, with a milking end time calculated prior to the actual milking, and a sub-phase that begins 1 minute before said end time. By reattaching the teat cup, preceded by a teat and/or teat cup cleaning if desired, and by restarting the milking, the total milking may take longer. As a result thereof, the predetermined sub-phase will probably also begin at a later point of time. The control device is then preferably configured to process all this dynamically.

It is pointed out here that the components of the milking system according to the invention, as to their external aspects, do not differ essentially from components known in the state of the art, for example comprising a milking box with controlled gates, a robot arm, teat cups, feeding device, etcetera, so that a more detailed description is omitted, with reference to general professional knowledge.

Step 2a refers to the beginning of the milking. The milking may, for example, start with a teat cleaning treatment. Subsequently a milking can be carried out and the milking can be ended with a post-treatment of the udder. Consequently, the term "milking" comprises here more than merely the milking proper, viz. also a pre- and post-treatment, although this is not necessary.

During the milking the dairy animal is fed in the milking parlour. Step 2b relates to the beginning of the feeding. From the control device a signal to dispense feed can be transmitted to a feeding device. The dispensing of feed can coincide with the beginning of the milking, but also at another moment if desired. It may in particular be advantageous to start feeding as soon as any action is carried out for which it is of importance that the animal is as immobile as possible, such as teat cleaning Step 3 in the flowchart relates to changing the feed portion size, when the predetermined sub-phase is reached, which sub-phase begins before the milking has been ended. The milking stops, according to the method, in a later step 4. Subsequently, the dairy animal will soon leave the milking parlour in a next step 5, because then no more feed is left.

In addition to the embodiments shown, various variants are possible without thereby departing from the scope of protection, such as is defined in the enclosed claims. In a variant of the embodiment shown, as already indicated above, the dispensing of feed can begin, for example, soon after the milking has begun.

According to the invention, there is thus provided a method of milking a dairy animal in a milking parlour, wherein the dispensing of feed can be controlled in such a manner that the time spent by the animal in the milking parlour is hardly or not subject to dawdling of a dairy animal after a milking, because remaining feed is still being consumed. The capacity of an automatic milking system for milking a group of dairy animals can thus advantageously be increased. Moreover, by optimizing the feed supply, the dairy animals can be prevented from becoming restless during the milking.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of feeding and milking a dairy animal by a milking system, wherein the milking system comprises a milking parlour with a milking device and a feeding device, the method comprising:
   identifying an individual dairy animal that presents itself at the milking parlour for a milking;
   milking the dairy animal in the milking parlour, wherein the milking is ended when a predetermined milking-ending criterion is met;
   dispensing feed to the dairy animal in a plurality of feed portions with the aid of the feeding device during the milking,
   wherein, when a predetermined sub-phase of the milking is reached prior to the end of milking the dairy animal, the feed portions being dispensed are reduced in size to an amount greater than zero.

2. The method according to claim 1, wherein an estimated end time for the milking is determined on the basis of the milking-ending criterion.

3. The method according to claim 2, wherein the milk-ending criterion is at least one of: historical data and historical data per individual animal.

4. The method according to claim 1, wherein meeting the milking-ending criterion comprises that the momentary milk flow comes below a first milk flow threshold value.

5. The method according to claim 4, wherein a momentary milk flow is the milk flow from the last teat that is being milked or from the last two teats that are being milked.

6. The method according to claim 4, wherein the momentary milk flow comes below the first milk flow threshold value during a milk flow threshold time.

7. The method according to claim 1, wherein meeting the milking-ending criterion comprises that a fat percentage of the milk exceeds a first threshold fat percentage.

8. The method according to claim 7, wherein the fat percentage of the milk is of milk from the last teat being milked.

9. The method according to claim 1, wherein the predetermined sub-phase begins either at a predetermined period of time preceding the end time, or at a predetermined percentage of the length of the milking.

10. The method according to claim 4, wherein the sub-phase begins when the milk flow, from all the teats or from either the last teat or last teats, comes below a second milk flow threshold value.

11. The method according to claim 10, wherein the second milk flow threshold value is higher than the first milk flow threshold value.

12. The method according to claim 7, wherein the sub-phase begins when the fat percentage of the milk exceeds a second threshold fat percentage.

13. The method according to claim 12, wherein the fat percentage is of the milk from the last teat that is being milked.

14. The method according to claim 12, wherein the second threshold fat percentage is lower than the first threshold fat percentage.

15. The method according to claim 1, wherein dispensing feed in a plurality of feed portions during the milking is divided into at least three successive predetermined sub-phases, and wherein the feed portion size in each later sub-phase is smaller than in each preceding sub-phase.

16. A milking system for milking a dairy animal, comprising
 a milking parlour for keeping a dairy animal,
 an identification system for identifying a dairy animal that presents itself for a milking;
 a milking device for milking the dairy animal;
 a feeding device for dispensing feed to the dairy animal in the milking parlour;
 a control device, wherein the control device is configured to control the milking device for milking a dairy animal, and control the feeding device for feeding the dairy animal; wherein the control device controls the feeding device to dispense feed portions that are reduced in size to an amount greater than zero when a predetermined sub-phase of the milking is reached prior to the end of milking the diary animal.

* * * * *